(12) United States Patent
Jin et al.

(10) Patent No.: US 9,396,348 B2
(45) Date of Patent: Jul. 19, 2016

(54) SYSTEM AND METHOD FOR ELECTRONIC STAMPING

(71) Applicant: TIANJIN SURSEN SOFTWARE TECHNOLOGY CO., LTD., Tianjin (CN)

(72) Inventors: Youbing Jin, Tianjin (CN); Donglin Wang, Tianjin (CN)

(73) Assignee: TIANJIN SURSEN INVESTMENT CO., LTD., Tianjin (CN)

( * ) Notice: Subject to any disclaimer, the term of this patent is extended or adjusted under 35 U.S.C. 154(b) by 0 days.

(21) Appl. No.: 14/386,521

(22) Filed: Sep. 19, 2014

(65) Prior Publication Data
US 2015/0121511 A1 Apr. 30, 2015

Related U.S. Application Data

(63) Continuation of application No. PCT/CN2012/075795, filed on May 21, 2012.

(30) Foreign Application Priority Data

Mar. 20, 2012 (CN) .......................... 2012 1 0074401

(51) Int. Cl.
| | |
|---|---|
| *G06F 21/00* | (2013.01) |
| *G06F 7/04* | (2006.01) |
| *G06K 9/00* | (2006.01) |
| *G06F 21/62* | (2013.01) |
| *G07C 9/00* | (2006.01) |
| *H04L 9/32* | (2006.01) |
| *G06F 17/30* | (2006.01) |
| *G06F 21/32* | (2013.01) |
| *G06F 21/64* | (2013.01) |

(52) U.S. Cl.
CPC ...... *G06F 21/6209* (2013.01); *G06F 17/30477* (2013.01); *G06F 21/32* (2013.01); *G06F 21/64* (2013.01); *G06K 9/00013* (2013.01); *G07C 9/00071* (2013.01); *G07C 9/00158* (2013.01); *H04L 9/3231* (2013.01); *H04L 9/3247* (2013.01)

(58) Field of Classification Search
CPC G07C 9/00071; G07C 9/00158; G06F 21/32; G06K 9/0085; G06K 9/00013
USPC ................ 726/19, 28; 713/186; 382/115, 124
See application file for complete search history.

(56) References Cited

U.S. PATENT DOCUMENTS

2004/0230891 A1* 11/2004 Pravetz ................. H04L 9/3247
715/229

* cited by examiner

*Primary Examiner* — Aravind Moorthy
(74) *Attorney, Agent, or Firm* — Duane Morris LLP

(57) ABSTRACT

A system and method for electronic stamping are disclosed. Personal fingerprint pre-stored is used to verify the fingerprint information collected, the document data and the fingerprint information is signed with a private key to get a first signature result, the user's public key and the pre-stored fingerprint information is then signed with a private key of a stamp producer to get a second signature result, the first signature result, the collected fingerprint information and the second signature result are combined to form electronic fingerprint stamp data.

8 Claims, 3 Drawing Sheets

SYSTEM AND METHOD FOR ELECTRONIC STAMPING

CROSS-REFERENCE TO RELATED APPLICATION

The application is a continuation of PCT/CN2012/075795 (filed on May 21, 2012), which claims priority of Chinese patent application 201210074401.2 (filed on Mar. 20, 2012), the contents of which are incorporated herein by reference.

FIELD OF THE INVENTION

The present invention is related to electronic signature technology, especially related to a system and method for electronic stamping.

BACKGROUND OF THE INVENTION

Electronic signature technology is widely applied with the development of science. The electronic signature can prevent documents from being tampered. However, the electronic signature is not a palpably object that can be used visually. Moreover, the way for using it is different from that a physical signature is used. Therefore, electronic stamping technology is derived gradually.

The electronic stamp is an application form of the electronic signature, which imitates a traditional physical stamp by using developed digital technology and makes the electronic signature which is invisible and untouchable having a physical stamp similar to the traditional habit. In this way, the electronic documents stamped electronically are very similar with the paper documents stamped physically. Normally, the presentation form of the electronic stamp may be an official stamp or signature graph, which can be used to ensure the validity of the document. The management and usage of the electronic stamp accord with the usage habit and using experience of the physical stamp.

SUMMARY OF THE INVENTION

The embodiments of the present invention are to provide a system and method for electronic stamping, which is safer compared with that in the prior art.

A system for electronic stamping includes:

a fingerprint collecting and recognizing device, adapted to collect a user's fingerprint information;

a fingerprint stamping device, connected with the fingerprint collecting and recognizing device; and adapted to receive the fingerprint information sent from the fingerprint collecting and recognizing device when a document is required to be stamped, verify whether the fingerprint information matches pre-stored fingerprint information and obtain the user's private key when there is pre-stored fingerprint information matching the fingerprint information collected, sign the document data and the fingerprint information with the private key to get a first signature result, sign the user's public key and the pre-stored fingerprint information with a private key of a stamp producer to get a second signature result, combine the first signature result, the collected fingerprint information and the second signature result to form electronic fingerprint stamp data;

a document processing device, adapted to display the collected fingerprint information recorded in the electronic fingerprint stamp data sent from the fingerprint stamp processing device on the document, when the document is required to be stamped.

A method for electronic stamping includes:

receiving fingerprint information of a user sent from a fingerprint collecting and recognizing device;

verifying whether the fingerprint information matches pre-stored fingerprint information, and obtaining the user's private key when there is pre-stored fingerprint information matching the fingerprint information collected;

signing the document data and the fingerprint information with the private key to get a first signature result;

signing the user's public key and the pre-stored fingerprint information with a private key of a stamp producer to get a second signature result;

combining the first signature result, the collected fingerprint information, the second signature result to form electronic fingerprint stamp data.

According to the technical scheme, the personal fingerprint pre-stored is used to verify the fingerprint information collected, so it ensure that the fingerprint only be used by the user him/herself and be prevented from being used by other unauthorized users. When a document is required to be stamped, the user need to press his/her finger on the fingerprint collecting and recognizing device. Then the collected finger print information will be displayed as an image in a specified position of the document, so that a "finger stamping" experience is achieved and the practical usage habit is met.

BRIEF DESCRIPTION OF THE DRAWINGS

To give a further description of the embodiments in the present invention or the prior art, the appended drawings used to describe the embodiments and the prior art will be introduced as follows. Obviously, the appended drawings described here are only used to explain some embodiments of the present invention. Those skilled in the art can understand that other appended drawings may be obtained according to these appended drawings without creative work.

DETAILED DESCRIPTION OF THE INVENTION

Figure 1:
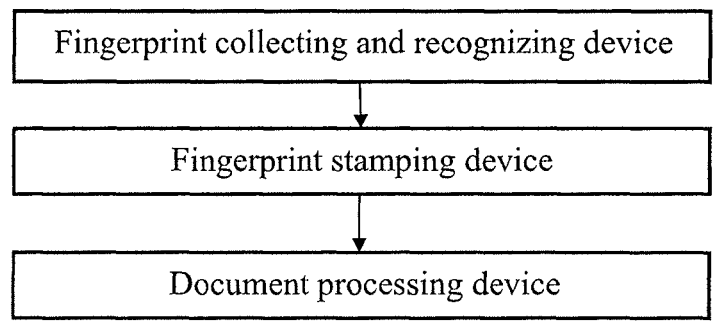
FIG. 1 illustrates a structure of a system for electronic stamping in an embodiment of the present invention.

The embodiments of the present invention are described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be through and complete, and will fully convey the scope of the invention to those skilled in the art. Among other things, the present invention may be embodied as systems, methods or devices. The following detailed description should not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on". The term "coupled" implies that the elements may be directly connected together or may be coupled through one or more intervening elements. Further reference may be made to an embodiment where a component is implemented and multiple like or identical components are implemented.

While the embodiments make reference to certain events this is not intended to be a limitation of the embodiments of the present invention and such is equally applicable to any event where goods or services are offered to a consumer.

Further, the order of the steps in the present embodiment is exemplary and is not intended to be a limitation on the embodiments of the present invention. It is contemplated that the present invention includes the process being practiced in other orders and/or with intermediary steps and/or processes.

The aim of the embodiments of the present invention is to provide a method for electronic stamping, so as to offer a new manner of electronic stamping.

In an embodiment of the present invention, an electronic stamp is formed by binding a human fingerprint with a personal private key. Then when the electronic stamp is used, the user can be provided with a "finger stamping" experience.

The reason of binding the human fingerprint with the private key is that every fingerprint is unique and complicated enough to provide sufficient features for identification. Moreover, due to its heredity and immutability, the fingerprint cannot be changed unless a skin-grafting is operated or damage down to basal stratum happens. Hence, the fingerprint can be used for personal identification.

Specifically, the binding process includes securing a user's private key with the user's fingerprint, i.e., the private key only can be accessed when received fingerprint matches fingerprint pre-stored in advance. In this way, it can prevent the private key from being used without an authorization. In an embodiment of the present invention, the user's private key and fingerprint information are pre-stored; and the private key could be extracted only when received fingerprint matches the pre-stored fingerprint.

FIG. 1 illustrates a structure of a system for electronic stamping in an embodiment of the present invention. As shown in FIG. 1, the system includes a fingerprint collecting and recognizing device, a fingerprint stamping device and a document processing device.

The fingerprint collecting and recognizing device is adapted to collect a user's fingerprint information.

The fingerprint stamping device is connected with the fingerprint collecting and recognizing device. When a document is required to be stamped, the fingerprint stamping device is adapted to receive the fingerprint information sent from the fingerprint collecting and recognizing device; verify whether the fingerprint information matches pre-stored fingerprint information and obtain the user's private key when there is pre-stored fingerprint information matching the fingerprint information collected; sign the document data and the fingerprint information with the private key to get a first signature result; sign the user's public key and the pre-stored fingerprint information with a private key of a stamp producer to get a second signature result; combine the first signature result, the collected fingerprint information, the second signature result and display position information of the fingerprint stamp to form electronic fingerprint stamp data; and then store the electronic fingerprint stamp data and the document data to complete the whole stamping process.

The document processing device is adapted to display the collected fingerprint information, which is recorded in the electronic fingerprint stamp data sent from the fingerprint stamp processing device, in a specified position of the document (the specified position is determined according to the display position information of the fingerprint stamp).

In another embodiment of the present invention, a fingerprint stamp verifying device may be further included. When there is a need to display or print a document stamped by a fingerprint stamp; the fingerprint stamp verifying device is adapted to use a public key of a stamp producer to verify the second signature result, verify whether the fingerprint information collected from the electronic fingerprint stamp data matches the pre-stored fingerprint information after a successful verification of the second signature result, meanwhile, use the user's public key to verify whether the first signature result is integral, inform the document processing device to display and print the document when the verifications of the integrity and the fingerprint information are both successful, and display the fingerprint information in the specified position.

The document processing device is further adapted to display and print the stamped document when the verification of the fingerprint stamp is successful. Meantime, the fingerprint information collected from the electronic fingerprint stamp is displayed in the specified position. When the verification of the fingerprint stamp is failed, the document is closed.

Those skilled in the art can understand that, the electronic fingerprint stamps of different documents may be predetermined to be stamped in the same position, so the collecting process of the display positions is not an essential technical feature of the fingerprint stamp verifying device. The display position information of the fingerprint stamp is not necessarily included in the electronic fingerprint stamp information. Correspondingly, the collected fingerprint information may be displayed in the predetermined position or randomly.

In an embodiment of the present invention, the fingerprint stamp verifying device and/or the fingerprint stamping device may be plug-in components of the document processing device. In this case, interactive interfaces may be set between them.

Those skilled in the art can understand that, the fingerprint stamp verifying device and the fingerprint stamping device may be integrated as one entity in practical usage.

By using the technical scheme of the present invention, the private key cannot be acquired unless the user's fingerprint information has been collected, which can ensure the signature only be executed by the user his/herself with his/her own private key.

Figure 2:
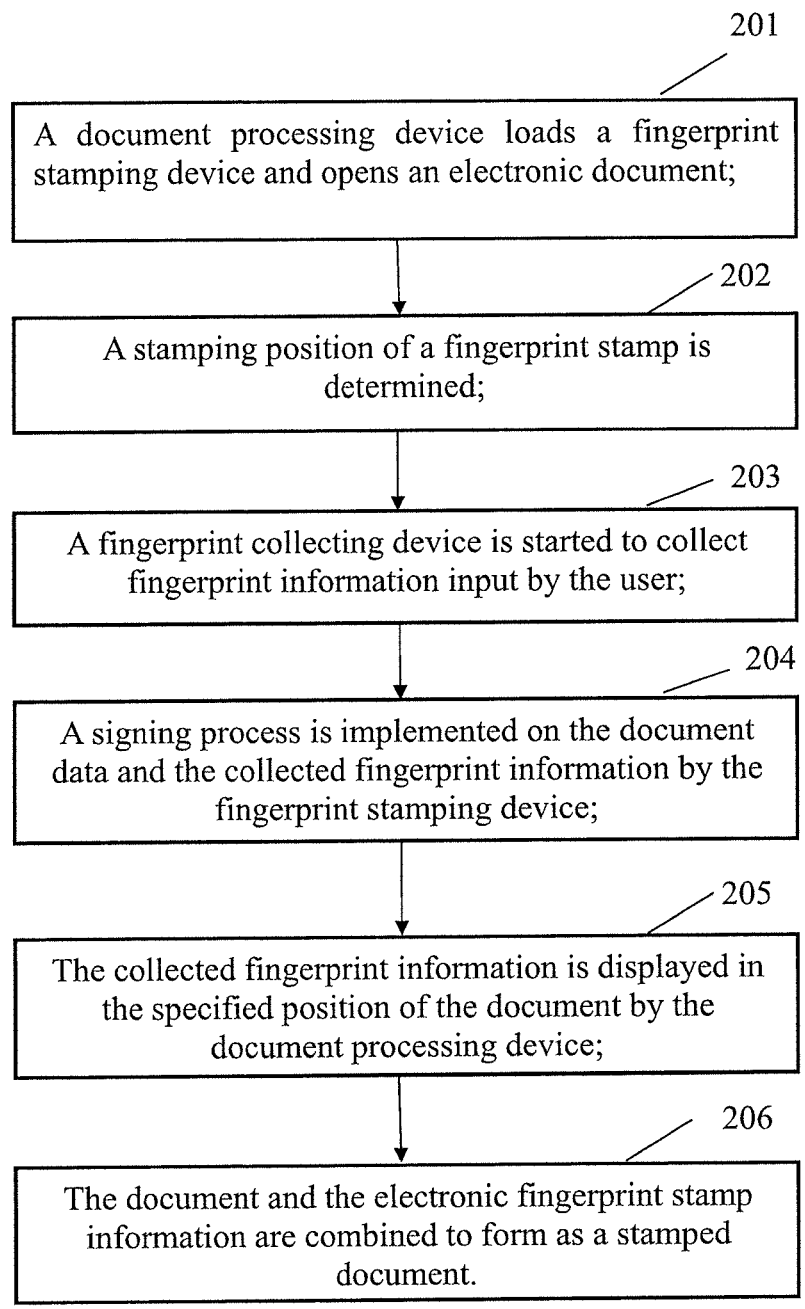
FIG. 2 illustrates a flow chart of a method for electronic stamping in an embodiment of the present invention.

FIG. 2 illustrates a flow chart of a method for electronic stamping in an embodiment of the present invention. As shown in FIG. 2, the method includes following steps.

Step 201: a document processing device loads a fingerprint stamping device and opens an electronic document.

Step 202: a stamping position of a fingerprint stamp is determined. Specifically, the stamping position may be determined by the input of a user through a mouse or a touch screen.

Step 203: a fingerprint collecting device is started to collect fingerprint information input by the user.

Step 204: a signing process is implemented on the document data and the collected fingerprint information by the fingerprint stamping device. The specific signing process may include following steps.

The fingerprint information sent from the fingerprint collecting and recognizing device is received; it is verified whether the fingerprint information matches pre-stored fingerprint information. If there is pre-stored fingerprint information matching the fingerprint information collected, the user's private key is obtained; otherwise, the signing process is ended.

The document data and the fingerprint information are signed with the private key to get a first signature result.

The user's public key and the pre-stored fingerprint information are signed with a private key of a stamp producer to get a second signature result. In practice, the signature may be finished in advance, and the signature result may be pre-stored in the stamping system.

The first signature result, the collected fingerprint information, the second signature result and display position information of the fingerprint stamp are combined to form electronic fingerprint stamp data.

Figure 3A:
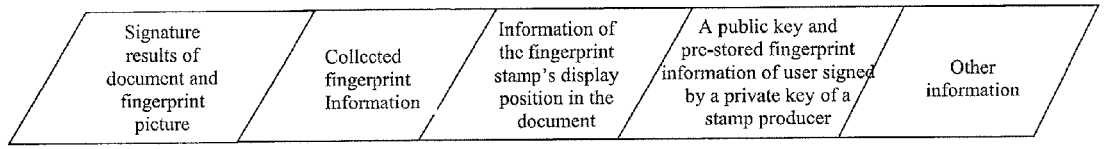
FIG. 3A illustrates a structure of fingerprint stamp data in an embodiment of the present invention.

FIG. 3A illustrates a structure of electronic fingerprint stamp data. As shown in FIG. 3A, the structure includes: signature results of document data and collected fingerprint information, a public key of a user and pre-stored fingerprint information both of which are signed by a private key of a stamp producer, collected fingerprint information, information of the fingerprint stamp's display position in the document, and other information related to the electronic stamp (which is not the key points of the present application).

Step 205: the collected fingerprint information is displayed in a specified position of the document by the document processing device (the specified position is determined by the information of the fingerprint stamp's display position).

Step 206: the document and the electronic fingerprint stamp information are combined to form as a document stamped and the document stamped is stored.

Figure 3B:
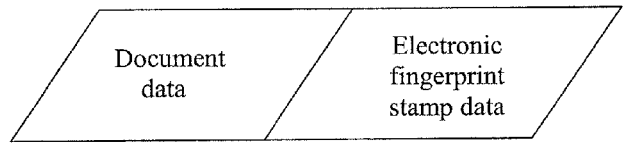
FIG. 3B illustrates a storage structure of a document stamped by a fingerprint stamp in an embodiment of the present invention.

FIG. 3B illustrates a storage structure of a document stamped by a fingerprint stamp in an embodiment of the present invention. As shown in FIG. 3B, the storage structure includes: document data and fingerprint stamping data.

Figure 4:
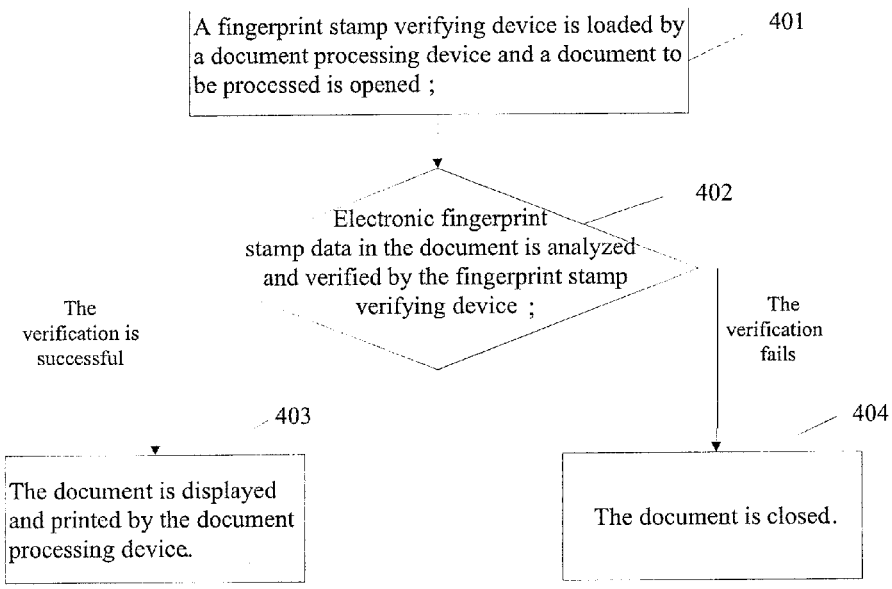
FIG. 4 illustrates a flow chart of a verification method for an electronic stamp in an embodiment of the present invention.

FIG. 4 illustrates a flow chart of a verification method for an electronic stamp in an embodiment of the present invention. As shown in FIG. 4, the method includes following steps.

Step 401: a fingerprint stamp verifying device is loaded by a document processing device and a document to be processed is opened.

Step 402: electronic fingerprint stamp data in the document is analyzed and verified by the fingerprint stamp verifying device. When the verification is successful, Step 403 is executed; otherwise, Step 404 is executed.

Specifically, the verifying process may include following steps.

A second signature result is verified by using a public key of a stamp producer. If the verification fails, the verifying process is ended; otherwise, it is verified whether the fingerprint information collected from the electronic fingerprint stamp data matches pre-stored fingerprint information. If the two pieces of information do not match, it is indicated that the fingerprint information collected may has been tampered or replaced, and the verifying process fails; or, the integrity of the first signature result is verified by using a user's public key. If the verification of the integrity fails, the verifying process is ended; otherwise, it is indicated that the stamp is successfully verified, and continue with following steps.

Step 403: the document is displayed and printed by the document processing device, and the collected fingerprint information, which is stored in the electronic fingerprint stamp data, is displayed in the display position of the fingerprint stamp.

Step 404: the document is closed.

Those skilled in the art can understand that, the electronic fingerprint stamps of different documents may be predetermined to be stamped in the same position, so Step 202 in FIG. 2 is not essential. In this situation, the display position information of the fingerprint stamp is not necessarily included in the electronic fingerprint stamp data; accordingly, in the embodiment of FIG. 4, the collected fingerprint information is displayed in a predetermined position or randomly.

Those skilled in the art can understand that, in the technical scheme of the present invention, only essential features are compared during a comparison of two pieces of fingerprint information. The images of the two pieces of fingerprint information are not required to be totally the same.

The content described above is only preferred embodiments of the present invention and should not be used to limit the protection scope of the present invention. Any changes, equivalent replacement or improvement within the spirits and principles of the present invention should be included in the protection scope of the present invention.

The invention claimed is:

1. A tangible system for electronic stamping, which comprising:
   a fingerprint collecting and recognizing device, adapted to collect user's fingerprint information;
   a fingerprint stamping device, connected with the fingerprint collecting and recognizing device; and adapted to receive the fingerprint information sent from the fingerprint collecting and recognizing device when a document is required to be stamped, verify whether the fingerprint information matches pre-stored fingerprint information and obtain the user's private key when there is pre-stored fingerprint information matching the fingerprint information collected, sign the document data and the fingerprint information with the private key to get a first signature result, sign the user's public key and the pre-stored fingerprint information with a private key of a stamp producer to get a second signature result, combine the first signature result, the collected fingerprint information and the second signature result to form electronic fingerprint stamp data;
   a document processing device, adapted to display the collected fingerprint information recorded in the electronic fingerprint stamp data sent from the fingerprint stamp processing device on the document, when the document is required to be stamped.

2. The tangible system of claim 1, further comprising:
   a fingerprint stamp verifying device, adapted to verify the second signature result with a public key of a stamp producer; verify whether the fingerprint information collected from the electronic fingerprint stamp data matches pre-stored fingerprint information after a successful verification of the second signature result, when there is a need to display or print a document stamped by a fingerprint stamp; use the user's public key to verify whether the first signature result is integral; inform the document processing device when the verifications of the integrity and the fingerprint information are both successful;

wherein, the document processing device is further adapted to display or print the document with the collected fingerprint information according to the fingerprint stamp verifying device's inform.

3. The tangible system of claim 2, wherein, the fingerprint stamping device and/or the fingerprint stamp verifying device are plug-in components of the document processing device.

4. The tangible system of claim 1, wherein, the fingerprint stamping device and/or the fingerprint stamp verifying device are plug-in components of the document processing device.

5. A method for electronic stamping, used on an electronic document, comprising:

receiving fingerprint information of a user sent from a fingerprint collecting and recognizing device;

verifying whether the fingerprint information matches pre-stored fingerprint information, and obtaining the user's private key when there is pre-stored fingerprint information matching the fingerprint information collected;

signing the document data and the fingerprint information with the private key to get a first signature result;

signing the user's public key and the pre-stored fingerprint information with a private key of a stamp producer to get a second signature result;

combining the first signature result, the collected fingerprint information, the second signature result to form electronic fingerprint stamp data.

6. The method of claim 5, wherein, on the stamp verifying side, the method further comprises:

using a public key of the stamp producer to verify the second signature result;

comparing pre-stored fingerprint information with fingerprint information collected from the electronic fingerprint stamp data when the verification of the second signature result is successful;

using the user's public key to verify whether the first signature result is integral when the two pieces of fingerprint information match; when the verification of the integrity is successful, it is indicated that the stamp is successfully verified, and continue with following steps.

7. The method of claim 6, wherein, when the stamp is successfully verified, the method further comprises:

displaying the fingerprint information collected from the electronic fingerprint stamp data.

8. The method of claim 7, wherein, the electronic fingerprint stamp data further comprises information of the fingerprint stamp's display position;

the method further comprises:

obtaining a stamping position of the fingerprint stamp in the document; and displaying the fingerprint information collected from the electronic fingerprint stamp data comprises:

displaying the collected fingerprint information in the specified position of the document with the information of the fingerprint stamp's display position.

* * * * *